United States Patent [19]
Takayama

[11] Patent Number: 5,896,472
[45] Date of Patent: Apr. 20, 1999

[54] IMAGE FORMING APPARATUS

[75] Inventor: Hidemi Takayama, Kawasaki, Japan

[73] Assignee: Canon Kabushiki Kaisha, Tokyo, Japan

[21] Appl. No.: 08/882,957

[22] Filed: Jun. 26, 1997

Related U.S. Application Data

[63] Continuation of application No. 08/383,359, Feb. 3, 1995, abandoned.

[30] Foreign Application Priority Data

Feb. 3, 1994 [JP] Japan ................... 6-011752
Feb. 2, 1995 [JP] Japan ................... 7-015868

[51] Int. Cl.⁶ .................... G03G 15/01; G01D 15/14
[52] U.S. Cl. .................... 382/287; 347/116; 347/118; 399/4
[58] Field of Search .................... 382/286, 287, 382/312, 321, 317; 395/104, 105, 106, 107, 108, 109; 347/115–118, 130; 355/202, 212, 326 R, 327; 399/4, 9, 47

[56] References Cited

U.S. PATENT DOCUMENTS

| | | | |
|---|---|---|---|
| 4,740,802 | 4/1988 | Stuckey-Kauffman et al. | 346/157 |
| 4,912,491 | 3/1990 | Hoshino et al. | 346/160 |
| 5,072,244 | 12/1991 | Aoki et al. | 346/160 |
| 5,175,570 | 12/1992 | Haneda et al. | 347/116 |
| 5,197,105 | 3/1993 | Uemura et al. | 382/321 |
| 5,241,400 | 8/1993 | Itagaki | 347/116 |
| 5,339,150 | 8/1994 | Hubble, III et al. | 347/116 |
| 5,381,167 | 1/1995 | Fujii et al. | 347/116 |
| 5,412,409 | 5/1995 | Costanza | 347/118 |
| 5,418,556 | 5/1995 | Andrews | 347/116 |
| 5,504,514 | 4/1996 | Nelson | 347/130 |

FOREIGN PATENT DOCUMENTS

| | | |
|---|---|---|
| 0575162 | 12/1993 | European Pat. Off. |
| 1-281468 | 11/1989 | Japan . |
| 4031876 | 4/1992 | Japan . |

*Primary Examiner*—Leo H. Boudreau
*Assistant Examiner*—Bhavesh Mehta
*Attorney, Agent, or Firm*—Fitzpatrick, Cella, Harper & Scinto

[57] ABSTRACT

An image forming apparatus includes a moving member for conveying a recording member on which an image is to be formed, image forming units for forming marks for detection of a position of the image on the moving member, an illuminating device for illuminating the marks for detection of the position, which includes a LED light source, a detecting device for detecting the marks, and a control device for controlling the image forming units with detection signals detected by the detecting device.

10 Claims, 5 Drawing Sheets

IMAGE FORMING APPARATUS

This application is a continuation of application No. 08/383,359, filed Feb. 3, 1995, now abandoned.

BACKGROUND OF THE INVENTION

1. Field of the Invention

The present invention relates to multicolor image forming apparatus with two or more image forming units juxtaposed, such as plane paper copiers, laser beam printers, printing apparatus, and so on.

2. Related Background Art

The conventional multicolor image forming apparatus are generally so arranged that different color images are formed at a plurality of image forming units, a sheet of paper is conveyed by conveying means, for example such as a conveying belt, and the images are transferred one over another on the sheet to form a multicolor image. Particularly in the case where a full color image is obtained by development of multiple colors, even a slight overlap deviation will degrade the image. For example, in the case of 400 dpi, even an overlap deviation of a fraction of a pixel (63.5 μm) will appear as changes in color and tone, so as to extremely degrade the image.

The conventional technology employed the way of relieving the overlap deviation of images by performing the multicolor development with a single image forming unit, that is, with a same scanning lens system, i.e., performing optical scanning under same optical characteristics. This method, however, had a problem that a considerable time is needed in outputting a multicolor image or full color image.

There is a method for solving this problem, in which separate optical scanning apparatus form images to obtain images of respective colors independently of each other and the images of respective colors are superimposed one over another on a sheet of paper conveyed by a conveying unit. A concern in this method, however, is a color deviation in superimposing the images.

A method effective against this color deviation is one as disclosed in Japanese Laid-open Patent Application No. 1-281468, in which marks for detecting a position of an image (image position detection marks), formed on a belt of the conveying unit, are detected and the image forming units are controlled to output the images of respective colors according to detection signals of the marks. Since the belt in the conveying unit generally moves up and down because of undulation etc., the detecting units of the marks for detection of image position need to detect accurate written positions even with up and down movement of the belt. Further, spectral reflectances of color toners etc. change depending upon colors in the case of light in the visible range. It is thus necessary to obtain stable outputs regardless of colors. Additionally, it is necessary for a light source in an illumination optical system for illuminating the marks for detection of image position to permit stable, high-quality detection of the marks.

SUMMARY OF THE INVENTION

Taking the above problems into account, the present invention is characterized in that in a detecting portion of marks for detection of image position, placed on a downstream side of a conveying belt for conveying a recording member to which an image is transferred, an optical axis of a detection optical system in the detecting portion is arranged as perpendicular to the conveying belt and in that a light source of infrared LED is used in an illumination optical system for illuminating the marks for detection of image position and a photodetector in the detection optical system is sensitive to infrared light.

DETAILED DESCRIPTION OF THE PREFERRED EMBODIMENTS

Figure 1:
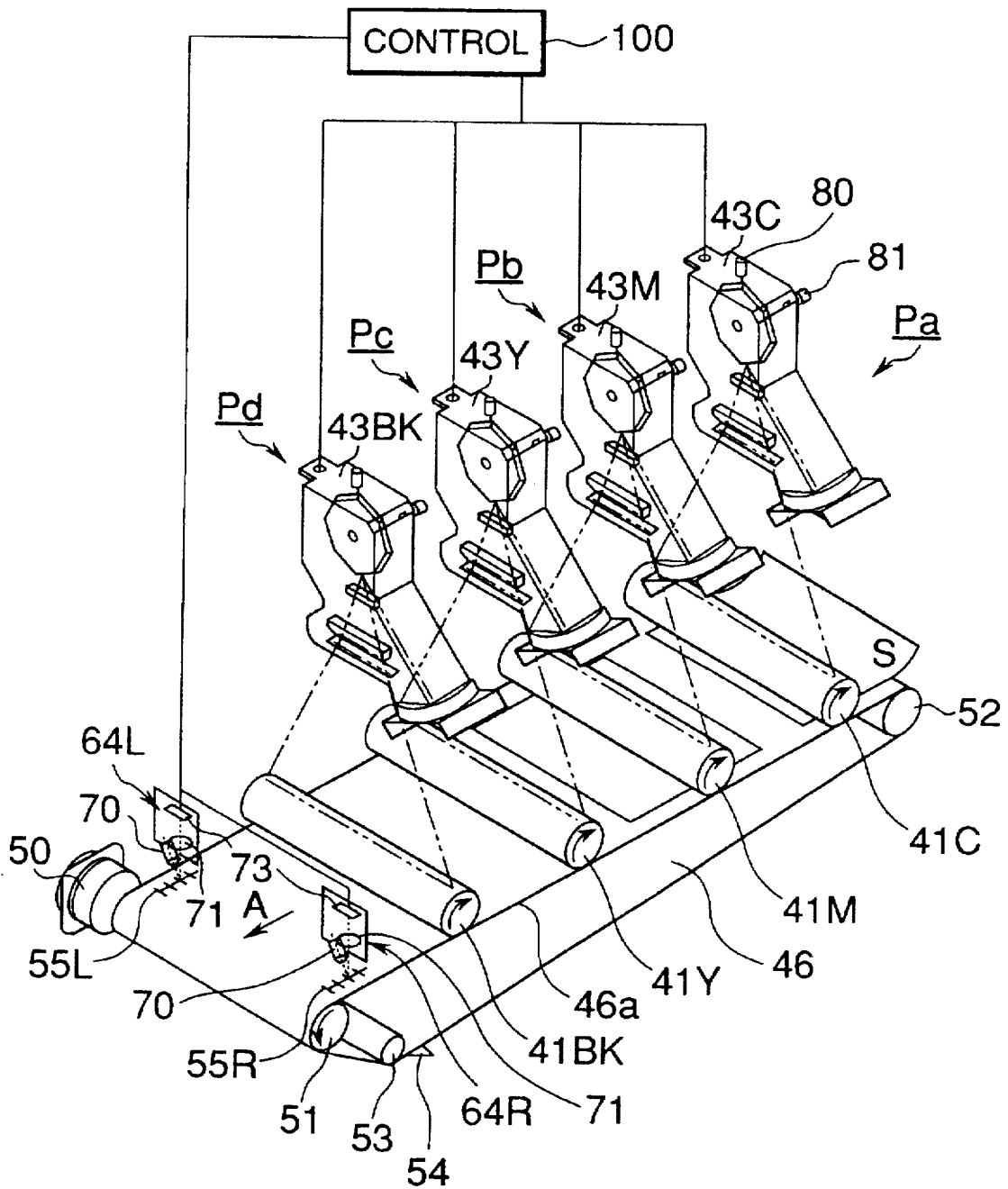
FIG. 1 is a drawing to illustrate the whole structure of an image forming apparatus of the present invention.

FIG. 1 shows an image forming apparatus according to the first embodiment of the present invention. The image forming apparatus according to the first embodiment of the present invention is summarized in the following description. In FIG. 1 there are a drive roller 51 and a driven roller 52 opposed at a predetermined distance to each other in the lower region in the apparatus body (not shown), and a moving member or transfer sheet conveying belt 46 for conveying a recording member S on which an image is to be formed is supported as wound around the drive roller 51 and driven roller 52. In the upper region above the transfer sheet conveying belt 46 in the apparatus body (not shown) there are four image forming units Pa, Pb, Pc, Pd juxtaposed at nearly equal intervals from right to left in FIG. 1.

The above structure is described below in more detail. The image forming units Pa, Pb, Pc, Pd have the same structure. The image forming unit Pa performs image formation of a part corresponding to a cyan color in document image information supplied, and has an optical scanning device 43C, for example such as a laser beam scanner, a photosensitive drum 41C on which an electrostatic latent image is formed by exposure of an image projected from the optical scanning device 43C, a cleaner provided near the photosensitive drum 41C, means (not shown) necessary in forming the electrostatic latent image on the photosensitive drum 41C, such as a primary charger, means (not shown) necessary for developing the electrostatic latent image, such as a developing device containing a cyan developer, as provided near the photosensitive drum 41C, a transfer charger (not shown) necessary in transferring the developed image onto a transfer sheet or the like, etc. The optical scanning device 43C is provided with stepping actuators 80, 81.

The image forming unit Pb performs image formation of a part corresponding to a magenta color in the document image information supplied, and has an optical scanning device 43M, for example such as a laser beam scanner, a photosensitive drum 41M on which an electrostatic latent image is formed by exposure of an image projected from the optical scanning device 43M, a developing device (not shown) containing a magenta developer, etc. The image forming unit Pc performs image formation of a part corresponding to a yellow color in the supplied document image information, and has an optical scanning device 43Y, for example such as a laser beam scanner, a photosensitive drum 41Y on which an electrostatic latent image is formed by exposure of an image projected from the optical scanning device 43Y, a developing device (not shown) containing a yellow developer, etc.

The image forming unit Pd performs image formation of a part corresponding to a black color in the supplied document image information, and has an optical scanning device 43BK, for example such as a laser beam scanner, a photosensitive drum 41BK on which an electrostatic latent image is formed by exposure of an image projected from the optical scanning device 43BK, a developing device (not shown) containing a black developer, etc. In addition to the above components, the image forming units Pb, Pc, Pd are also provided with devices similar to those as described with the image forming unit Pa, which are omitted to explain. As seen from FIG. 1, the photosensitive drums 41C, 41M, 41Y, 41BK are arranged as rotatable in the direction of the arrows in FIG. 1 (i.e., in the clockwise direction).

The sheet conveying belt 46 is so arranged that a transfer medium S (recording member) such as a transfer sheet supplied from a sheet feed mechanism (not shown) provided rightward in FIG. 1 is mounted on the belt 46 and is conveyed to the image forming units Pa, Pb, Pc, Pd (in the direction of the arrow in the drawing). The sheet conveying belt 46 is also wound via a tension roller 53 as well as the drive roller 51 and driven roller 52. The tension roller 53 is arranged to exert a tension on the sheet conveying belt 46 by a spring (not shown) provided obliquely below the drive roller 51. There are detecting means for detecting marks for detection of image position. That is, mark reading devices 64L, 64R are provided in an upper space on either side of the conveying direction A of the sheet conveying belt 46 in the region of the sheet conveying belt 46 between the photosensitive drum 41BK and the drive roller 51.

The detecting means for detecting the marks for detection of image position, i.e., mark reading devices 64L, 64R are arranged to detect four position detection marks of a cross shape as shown in FIG. 1 (hereinafter referred to as register marks) 55R, 55L, which are formed in a non-image-forming region of the respective photosensitive drums 41C, 41M, 41Y, 41BK before the image forming apparatus starts carrying out the image forming process and which are transferred to the belt 46 on either side of the conveying direction of the sheet conveying belt 46. The register marks 55R, 55L have the same structure.

The mark reading devices 64L, 64R each are provided with a detection optical system 71 as a detection system, a CCD line sensor 73 as a light-receiving system, an illumination lamp 70 as an illumination system, etc. The mark reading devices 64R, 64L and register marks 55R, 55L will be described in more detail hereinafter. A cleaner blade 54 is set near the tension roller 53 and on the outer periphery of the sheet conveying belt 46 while being in contact with the outer surface of the conveying belt 46. The cleaner blade 54 is arranged to remove the register marks 55R, 55L, having been transferred onto the outer surface of the conveying belt 46, at a step after completion of mark detection and before execution of the image forming process.

A motor 50 is attached to the drive roller 51 in order to rotation-drive the drive roller 51 in the direction of the arrow in FIG. 1 (i.e., in the counterclockwise direction). The motor 50 is provided with a pulse encoder (not shown), and the rotation speed of motor 50 is subjected to a phase lock loop control (hereinafter referred to as a PLL control) based on a detection signal of rotational speed output from the pulse encoder. Similarly as the motor 50, a pulse encoder (not shown) is given to each of photosensitive drum drive motors (not shown) for driving the photosensitive drums 41C, 41M, 41Y, 41BK, and the rotational speeds of the motors are subjected to the PLL control. Since the PLL control is a well known technique, the description thereof is omitted herein.

In the image forming apparatus of the present invention the image forming process means multicolor image formation including steps of mounting a transfer sheet S on the sheet conveying belt 46, conveying the transfer sheet S to each of the image forming units Pa, Pb, Pc, Pd, and transferring images formed on the respective image forming units Pa, Pb, Pc, Pd onto the transfer sheet S in a superimposed manner.

When the transfer sheet S is supplied at a predetermined timing from the sheet feed device (not shown) provided rightward in FIG. 1 onto the sheet conveying belt 46, the sheet conveying belt 46 receiving the transfer sheet S conveys it leftward in FIG. 1 (or in the direction of the arrow A in FIG. 2) thereon. With arrival of the transfer sheet S, each image forming unit Pa, Pb, Pc, Pd performs steps of charge, exposure, and development, and transfers a toner image of either color of cyan, magenta, yellow, and black formed on the photosensitive drum onto the transfer sheet S in order. After completion of the above transfer steps, the transfer sheet S is conveyed to a fixing device (not shown) provided leftward in FIG. 1 by the sheet conveying belt 46 to be image-fixed and thereafter is discharged onto a sheet tray (not shown) or the like provided outside the apparatus body. The image forming process is completed as described above.

Prior to execution of the image forming process, the image forming units Pa, Pb, Pc, Pd form four marks for detection of image position corresponding to the four image forming units Pa, Pb, Pc, Pd on the sheet conveying belt 46.

Prior to execution of the image forming process as described above, the detecting means for detecting the marks for detection of image position, i.e., mark reading devices 64L, 64R detect the four image position detection marks of the cross shape as shown in FIG. 1 (hereinafter referred to as register marks) 55R, 55L, which were formed in the non-image-forming region of the photosensitive drums 41C, 41M, 41Y, 41BK and which were transferred on either side of the conveying direction of the sheet conveying belt 46. The control unit 100 controls the image forming units Pa, Pb, Pc, Pd with detection signals thus detected.

Figure 2:
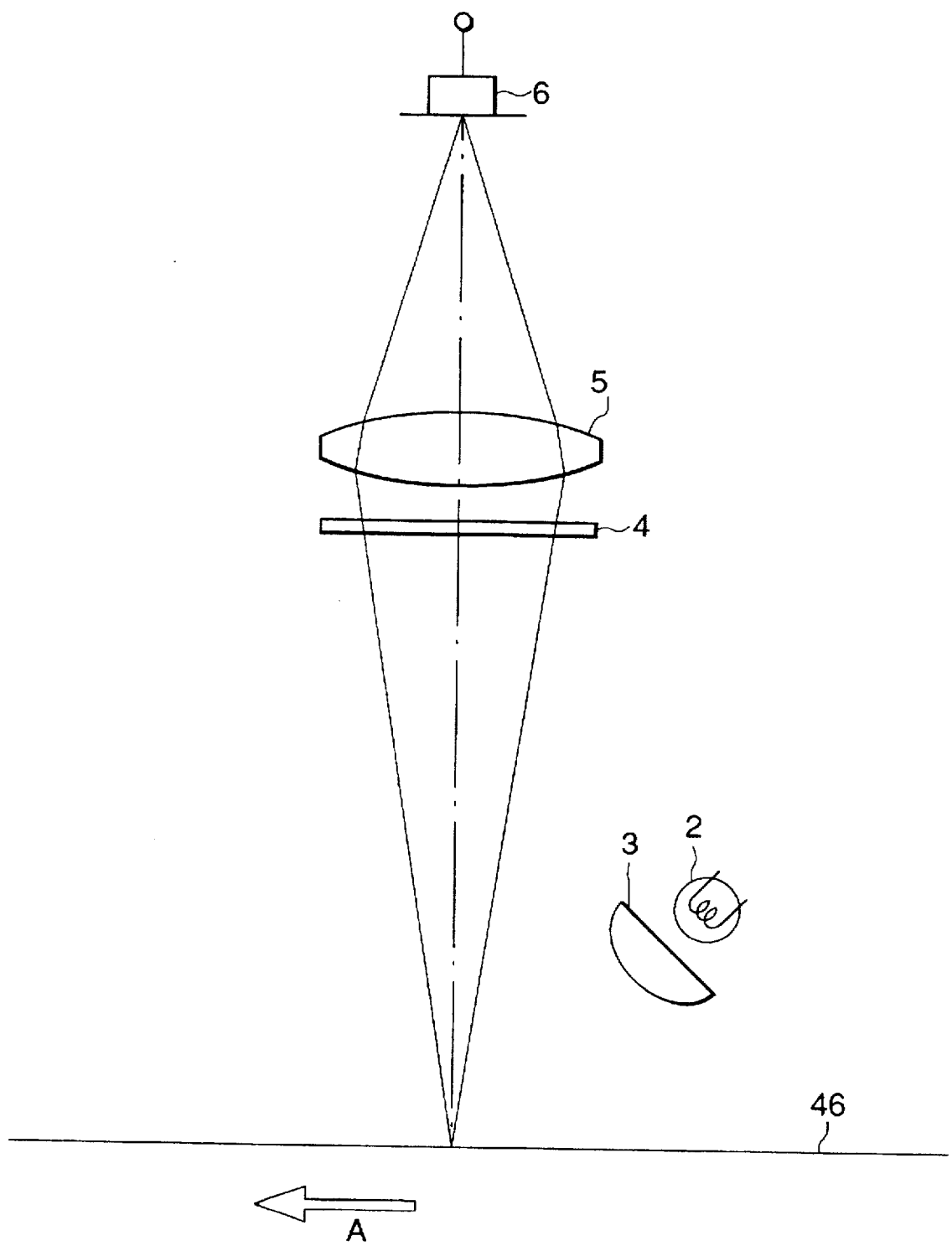
FIG. 2 is an explanatory drawing to show a main part of the first embodiment of a reading apparatus for reading the image position detection marks.

FIG. 2 is a schematic drawing to show a main part of the reading devices 64L, 64R for reading the image position detection marks in the first embodiment of the present invention. In FIG. 2, numeral 46 designates a transfer sheet conveying belt, 2 a LED lamp, 3 a condenser lens, 4 an infrared light transmitting filter, 5 an imaging optical system, and 6 a photodetector such as CCD.

When the register marks formed on the sheet conveying belt 46 by the image forming units not shown are conveyed with movement of the conveying belt 46 to below the reading devices 64L, 64R for reading the image position detection marks, light emitted from the light source for emitting infrared light, such as the LED lamp 2 is approximately collimated by the condenser lens 3 to illuminate the register marks written with a toner or the like. Part of reflected light as scattered by the register marks written with the toner or the like passes through the IR-transmitting filter 4 and is focused by the imaging optical system 5 on the photodetector 6 such as CCD sensitive to the infrared light, to be read thereby. Although the spectral reflectances of the register marks in the visible region generally change depending upon the color toners of cyan, magenta, yellow, black, etc., stable outputs can be obtained from the photodetector 6 by using the light source that emits the light in the infrared region. If the optical axis of the imaging optical system 5 is inclined relative to the normal line to the conveying belt 46 in this case, detection positions of the register marks change with up and down movement of the conveying belt 46, thereby being detected as an image deviation. The image deviation can be minimized in reading by setting the optical axis of the imaging optical system 5 as to be normal to the conveying belt 46.

As described above, the image forming apparatus of the present invention is an image forming apparatus for performing multicolor development for forming color images based on image information to form superimposed images, said image forming apparatus controlling the image forming units (Pa, Pb, Pc, Pd) to correct a transfer image deviation, based on detection signals output from the position detecting means (64R, 64L), and, in order to correct the transfer image deviation, comprising the means (41C, 41M, 41Y, 41BK) for transferring the image position detection marks (55R, 55L) onto the image transfer region, the conveying member (46) for conveying the image position detection marks transferred, the illumination system (2, 3) placed on the downstream side in the moving direction of the conveying member (46) and illuminating the image position detection marks (55R, 55L) with infrared light, and the optical system (4, 5) for focusing the image position detection marks on the photodetector (6), wherein the optical axis of the optical system (4, 5) is perpendicular to the surface on which the image position detection marks (55R, 55L) are formed.

Figure 3:
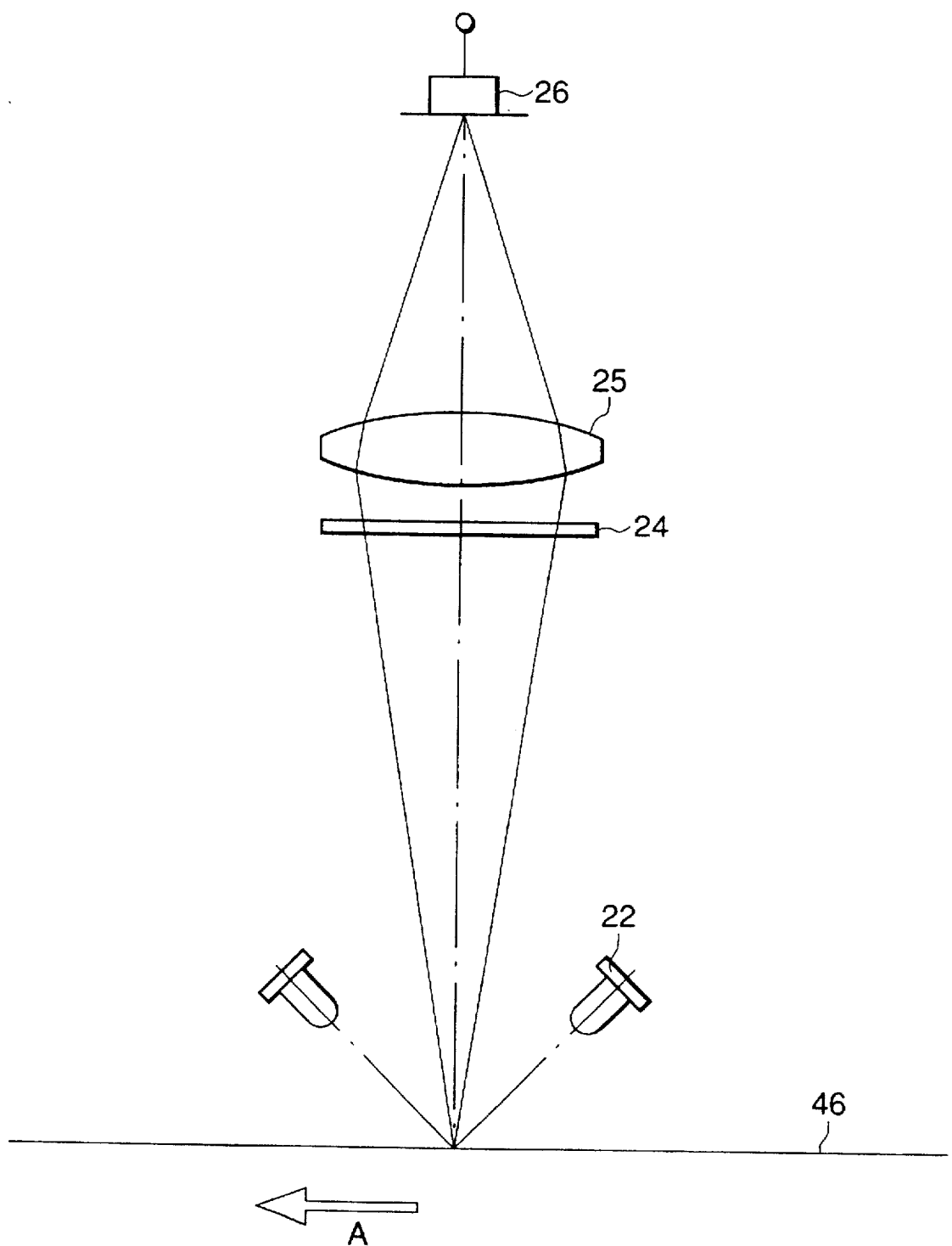
FIG. 3 is an explanatory drawing to show a main part of the second embodiment of the reading apparatus for reading the image position detection marks.

FIG. 3 is a schematic drawing to show a main part of another reading apparatus for reading the image position detection marks in the second embodiment of the present invention. In FIG. 3, numeral 46 designates a transfer sheet conveying belt, 22 LED lamps as infrared LED light sources, 24 a dustproof glass plate, 25 an imaging optical system, and 26 a photodetector such as CCD.

When the register marks formed on the conveying belt 46 by the image forming units not shown are conveyed with movement of the conveying belt 46 to below the reading devices for reading the image position detection marks, light emitted from the infrared LED light sources 22 illuminates the register marks written with a toner or the like. Part of reflected light as scattered by the register marks of the toner or the like passes through the dustproof glass 24 to be focused on the photodetector 26 such as CCD sensitive to the infrared light, by the imaging optical system 25 and then to be read.

Here, the LED lamps 22 as infrared LED light sources are arranged in symmetry with respect to the optical axis of the imaging optical system 25. When the infrared LED light sources 22 are arranged in symmetry with respect to the optical axis of the imaging optical system 25, the quantity of light can be uniformly distributed in the writing area of the marks, whereby the marks can be detected accurately.

Figure 4:
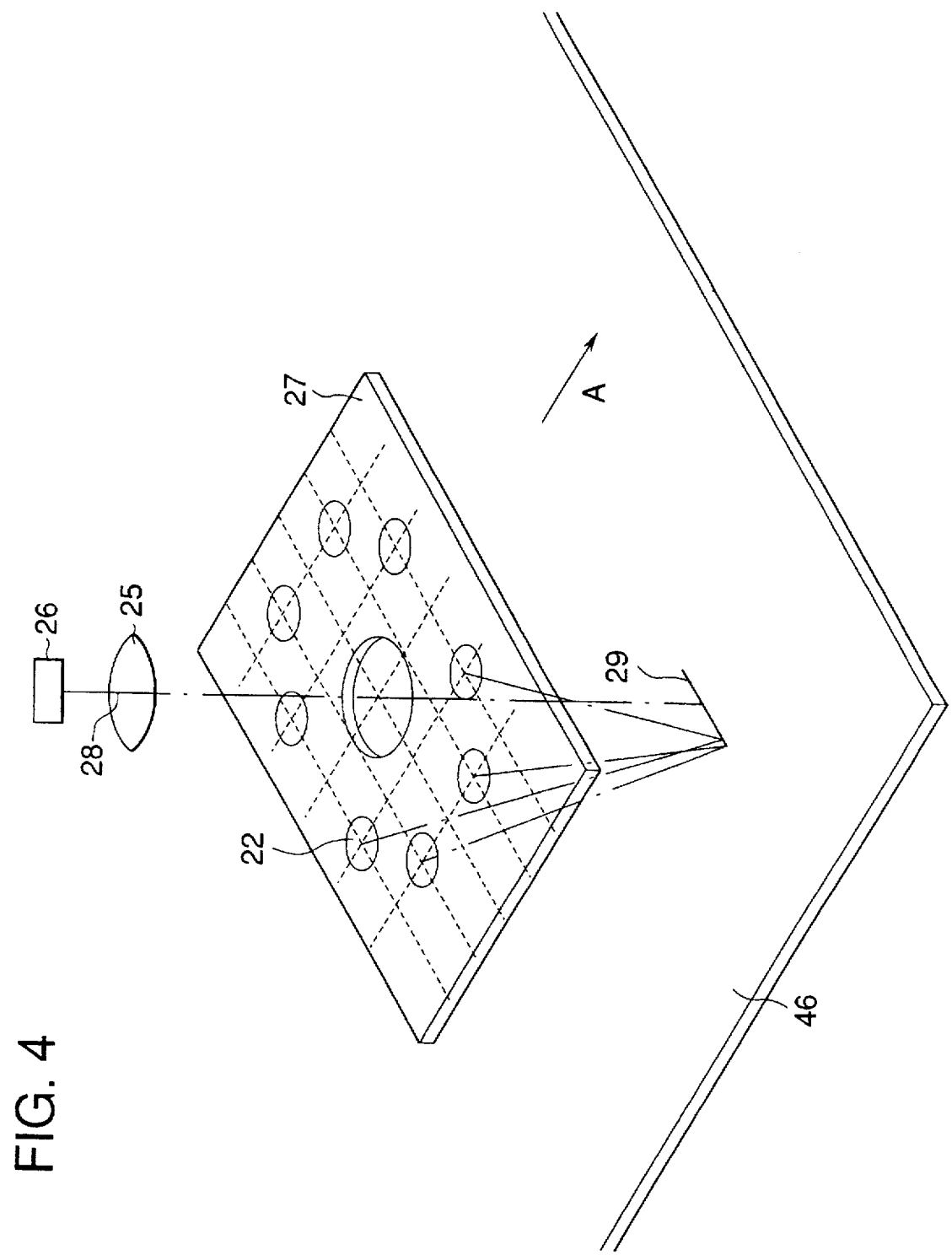
FIG. 4 is a perspective view to show another main part of the second embodiment of the reading apparatus for reading the image position detection marks.

FIG. 4 is a perspective view to show a layout of infrared LED light sources 22 where the read area is 6 mm. In FIG. 4, numeral 22 designates LED lamps as infrared LED light sources, 27 a LED-source mount member, 46 a transfer sheet conveying belt, 25 an imaging optical system, 26 a photodetector such as CCD, 28 an optical axis of the imaging optical system, and 29 a line read by CCD 26. As shown in FIG. 4, eight infrared LED light sources 22 are arranged in symmetry with respect to the optical axis 28 of the imaging optical system 25. In this case, the eight infrared LED sources 22 are so arranged that all optical axes of the infrared LED sources 22 are directed to the image position of CCD 26 through the imaging optical system 25, that is, on the read line 29. Further, because a light distribution of infrared LED sources is relatively wide, assuming that a position where the optical axis of the imaging optical system 25 intersects with and on the read line 29 is 0% and a position farthest from the optical axis 28 of the imaging optical system 25 is 100%, a uniform light distribution is attained by arranging the all optical axes as to be directed to between 80% and 110% of the read line. By arranging the infrared LED sources 22 in symmetry with respect to the optical axis 28 of the imaging optical system 25, the symmetry of distribution can be maintained even with up and down movement of the conveying belt 21, which minimizes degradation of the light quantity distribution.

Figure 5:
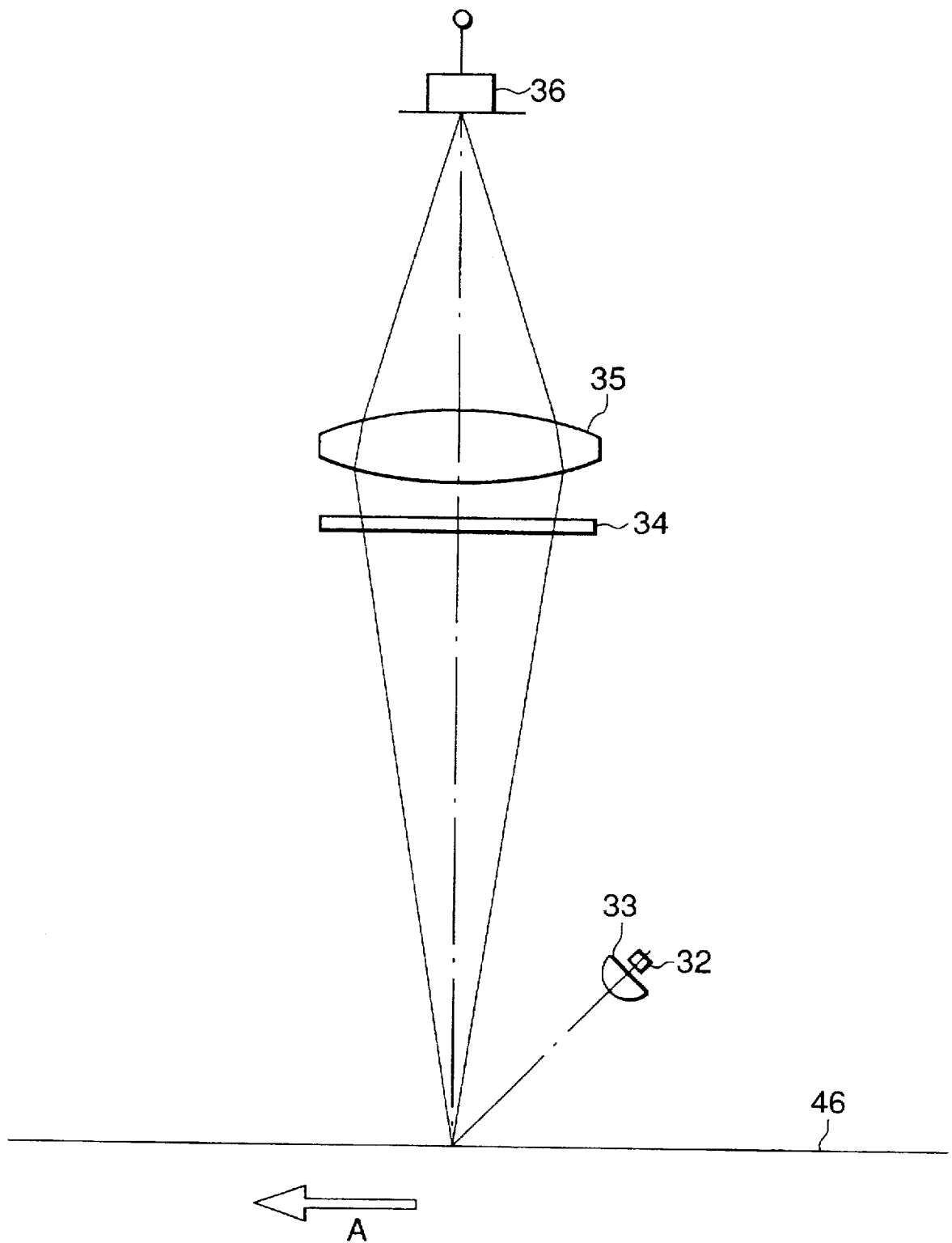
FIG. 5 is an explanatory drawing to show a main part of the third embodiment of the reading apparatus for reading the image position detection marks.

FIG. 5 is a schematic drawing to show a main part of another reading apparatus for reading the image position detection marks in the third embodiment of the present invention. In FIG. 5, numeral 46 designates a transfer sheet conveying belt, 32 an infrared LED chip, 33 a condenser lens, 34 a dustproof glass plate, 35 an imaging optical system, and 36 a photodetector such as CCD. When the register marks formed on the conveying belt 46 by the image forming units not shown are conveyed with movement of the conveying belt 46 to below the reading devices for reading the image position detection marks, light emitted from the infrared LED source 32 illuminates the register marks written with a toner or the like. Part of reflected light as scattered by the register marks of the toner or the like passes through the dustproof glass 34 to be focused on the photodetector 36 such as CCD sensitive to the infrared light, by the imaging optical system 35 and then to be read. The LED light source 32 is a LED array having LED chips arranged in an array, which is arranged in parallel with the conveying belt 46, which is a surface on which the image position detection marks are formed, and which is perpendicular to the conveying direction. The light from the LED array is approximately collimated by the condenser lens 33 set in front of the LED array. This arrangement can minimize a change in light quantity with up and down movement of the conveying belt 46.

According to the present invention, since the LED light source for radiating an infrared light is employed for the illuminating optical system for illuminating the image position detection mark, the following meritorious effects can be obtained in comparison to the case of combination of the illumination lamp and the infrared transmitting filter.

(1) In the LED light source, since it is not necessary to provide the infrared light transmitting filter or the like, the assembly of the LED light source can be performed with a small space, and thereby reducing cost of the illumination optical system.

(2) The size of the image position detection mark formed on the conveying belt is about 6 mm×6 mm. For this reason, it is necessary to illuminate the narrow area of the image position detection mark with light having uniform light quantity distribution so as to detect the mark satisfactorily. In this connection, the LED light source is superior in the rectilinear propagation characteristics of light. Therefore, it is possible to illuminate the narrow area with light having uniform light quantity distribution. Thus, the LED light source is suitable for detecting the image position formed on the conveying belt.

(3) In an ordinary illumination lamp, when the drive current is changed, the light emitting wavelength is also changed. For this reason, the spectral energy distribution in the infrared region of the light having passed through the infrared light transmitting filter is changed as well.

In contrast, in the LED light source, the light emitting wavelength is hardly changed even if the drive current is changed. For this reason, it is possible to always illuminate the image position detection mark with light having the identical wavelength. As a result, the detection of the mark can be stably performed.

(4) In the ordinary illumination lamp, a large heat generation is caused upon light emission. For this reason, there is a possibility to deteriorate the infrared light transmitting filter, the lens, the conveying belt and so on provided in the vicinity of the illumination lamp. In contrast, in the LED light source, since the heat generation upon light emission is quite small in comparison to the ordinary lamp, it is possible to perform the mark detection stably over a long period.

(5) In the LED light source, it is not necessary to consider the life span unlike the ordinary illumination lamp. Therefore, since it is not necessary to exchange the LED light source after assembly into the apparatus, the reliability of the apparatus can be enhanced.

As described above, the present invention is characterized by the image forming apparatus for performing the multicolor development for forming color images to form superimposed images, said image forming apparatus controlling the image forming units with signals output from the position detecting means, and comprising the conveying member for conveying the image position detection marks transferred in the image transfer region, the illumination system having the LED light source for illuminating the marks with infrared light, and the optical system for focusing the marks on the photodetector, wherein the optical axis of the optical system is perpendicular to the surface on which the marks are formed.

The present invention can provide the image forming apparatus which detects the image position detection marks and which controls the image forming units, based on the detection results of the marks, to perform multicolor development to form superimposed images, which can minimize a detection error due to the up and down movement of the image conveying means such as the transfer belt, thereby accurately detecting the image position.

What is claimed is:

1. An image forming apparatus comprising:

a moving member for conveying a recording member on which an image is to be formed;

image forming means for forming a mark for detection of a position of the image on said moving member;

illuminating means for illuminating said mark for detection of the position, said illuminating means comprising a LED light source;

detecting means for detecting said mark for detection of the position; and control means for controlling said image forming means with a detection signal detected by said detecting means, wherein said detecting means comprises a detection optical system and an optical axis of said detection optical system is perpendicular to a surface on which said mark for detection of the position is formed, wherein said LED light source comprises a plurality of LED lamps and wherein said plurality of LED lamps are arranged in symmetry with respect to the optical axis of said detection optical system, and wherein said LED light sources are each arranged at an angle to the optical axis of said detection optical system.

2. An image forming apparatus according to claim 1, wherein said LED light source comprises a plurality of LED lamps.

3. An image forming apparatus according to claim 1, wherein said illuminating means comprises a LED array in which LED chips are arranged in an array, and a condenser lens for approximately collimating light from said LED array.

4. An image forming apparatus according to claim 1, wherein said image forming means comprises a plurality of image forming units.

5. An image forming apparatus according to claim 1, wherein said detecting means detects reflected light from said mark for detection of the position.

6. A method of detecting a mark for positional detection of an image in an image forming apparatus, comprising the steps of:

conveying a recording member on which an image is to be formed by a moving member;

forming a mark for positional detection of an image onto said moving member by image forming means;

illuminating said mark for positional detection by illuminating means comprising a LED light source;

detecting said mark for positional detection by detecting means; and controlling said image forming means with a detection signal detected by said detecting means, wherein said detecting means comprises a detection optical system and an optical axis of said detection optical system is perpendicular to a surface on which said mark for detection of the position is formed, wherein the LED light source comprises a plurality of LED lamps and wherein said plurality of LED lamps are arranged in symmetry with respect to the optical axis of said detection optical system, and wherein said LED light sources are each arranged at an angle to the optical axis of said detection optical system.

7. A method according to claim 4, wherein said LED light source comprises a plurality of LED lamps.

8. A method according to claim 4, wherein said illuminating means comprises a LED array in which LED chips are arranged in an array, and a condenser lens for substantially collimating light from said LED array.

9. A method according to claim 6, wherein said image forming means comprises a plurality of image forming units.

10. A method according to claim 6, wherein said detecting means detects light reflected from said mark for positional detection.

* * * * *

UNITED STATES PATENT AND TRADEMARK OFFICE
CERTIFICATE OF CORRECTION

PATENT NO. : 5,896,472
DATED : April 20, 1999
INVENTOR(S) : HIDEMI TAKAYAMA

It is certified that error appears in the above-identified patent and that said Letters Patent is hereby corrected as shown below:

<u>COLUMN 1</u>,
Line 10, "plane" should read --plain--.

<u>COLUMN 8</u>,
Line 51, "claim 4," should read --claim 6,--; and
Line 53, "claim 4," should read --claim 6,--.

Signed and Sealed this

Second Day of November, 1999

Attest:

Attesting Officer

Q. TODD DICKINSON

Acting Commissioner of Patents and Trademarks